United States Patent
Shirai et al.

(10) Patent No.: US 10,637,332 B2
(45) Date of Patent: Apr. 28, 2020

(54) ELECTRIC ACTUATOR

(71) Applicant: NIDEC TOSOK CORPORATION, Kanagawa (JP)

(72) Inventors: Hiroshi Shirai, Kanagawa (JP); Toshiaki Nakamura, Kanagawa (JP); Yutaka Uematsu, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 7 days.

(21) Appl. No.: 16/209,972

(22) Filed: Dec. 5, 2018

(65) Prior Publication Data

US 2019/0173360 A1    Jun. 6, 2019

(30) Foreign Application Priority Data

Dec. 6, 2017 (JP) ................. 2017-234308

(51) Int. Cl.

| H02K 11/00 | (2016.01) |
| --- | --- |
| H02K 5/22 | (2006.01) |
| H02K 7/11 | (2006.01) |
| H02K 11/215 | (2016.01) |
| H02K 7/116 | (2006.01) |
| H02K 11/33 | (2016.01) |

(52) U.S. Cl.
CPC .......... *H02K 11/215* (2016.01); *H02K 5/225* (2013.01); *H02K 7/116* (2013.01); *H02K 11/33* (2016.01)

(58) Field of Classification Search
CPC .......... H02K 5/22; H02K 5/225; H02K 11/21; H02K 11/215; H02K 11/33; H02K 7/11–7/116

USPC .................. 310/68 B, 71, 83, 99
See application file for complete search history.

(56) References Cited

U.S. PATENT DOCUMENTS

| 2004/0061391 | A1* | 4/2004 | Matsuyama | ............ G01P 1/026 |
| --- | --- | --- | --- | --- |
| | | | | 310/71 |
| 2009/0058208 | A1* | 3/2009 | Kimura | ................ H02K 5/1732 |
| | | | | 310/83 |

FOREIGN PATENT DOCUMENTS

| JP | 2013247798 | 12/2013 |
| --- | --- | --- |
| JP | 2016208700 | 12/2016 |
| WO | 2015133291 | 4/2017 |

* cited by examiner

*Primary Examiner* — Thomas Truong
(74) *Attorney, Agent, or Firm* — JCIPRNET

(57) ABSTRACT

An electric actuator is provided. The electric actuator includes a motor, a deceleration mechanism, case, an output part, a first rotation sensor and a holding member that holds the first rotation sensor in the case. The case includes a first recess that is recessed from an inner surface of the case to one side in a first direction and a support surface that faces the other side in the first direction. The first rotation sensor includes a sensor main body which includes a sensor chip and is accommodated in the first recess and a projection that protrudes in a second direction orthogonal to the first direction from the sensor main body. The projection is supported on the support surface from one side in the first direction. The sensor main body is disposed on the other side in the first direction away from the bottom surface of the first recess.

20 Claims, 4 Drawing Sheets

ELECTRIC ACTUATOR

CROSS-REFERENCE TO RELATED APPLICATION

This application claims the priority of Japan patent application serial no. 2017-234308, filed on Dec. 6, 2017. The entirety of the above-mentioned patent application is hereby incorporated by reference herein and made a part of this specification.

BACKGROUND

Technical Field

The disclosure relates to an electric actuator.

Description of Related Art

A rotary actuator disclosed in Japanese Laid-open Publication No. 2013-247798 includes a motor that rotates and drives an input shaft, a decelerator that decelerates rotation of the input shaft and transmits it to an output shaft, and a case in which the motor and the decelerator are accommodated.

In the rotary actuator described above, it is conceivable that a rotation sensor configured to detect rotation of the output shaft may be held in the case. However, in this case, depending on a difference between coefficients of thermal expansion of the rotation sensor and the case, an amount of thermal deformation of the rotation sensor may be different from an amount of thermal deformation of the case, and stress may be applied to a sensor chip of the rotation sensor. In this case, the sensor chip may be distorted or damaged, and the detection accuracy of the rotation sensor may decrease.

SUMMARY

The disclosure is to provide an electric actuator.

According to one exemplary aspect of the disclosure, there is provided an electric actuator which includes a motor having a motor shaft that extends in an axial direction; a deceleration mechanism that is connected to the motor shaft; a case in which the motor and the deceleration mechanism are accommodated; an output part to which rotation of the motor shaft is transmitted through the deceleration mechanism; a first rotation sensor that detects rotation of the output part; and a holding member that holds the first rotation sensor in the case, wherein the case includes a first recess that is recessed from an inner surface of the case to one side in a first direction, and a support surface that faces the other side in the first direction and is disposed on the other side in the first direction relative to a bottom surface of the first recess, wherein the first rotation sensor includes a sensor main body which includes a sensor chip and is accommodated in the first recess, and a projection that protrudes in a second direction orthogonal to the first direction from the sensor main body, wherein the projection is supported on the support surface from one side in the first direction, and wherein the sensor main body is disposed on the other side in the first direction away from the bottom surface of the first recess.

The above and other elements, features, steps, characteristics and advantages of the disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

Figure 1:
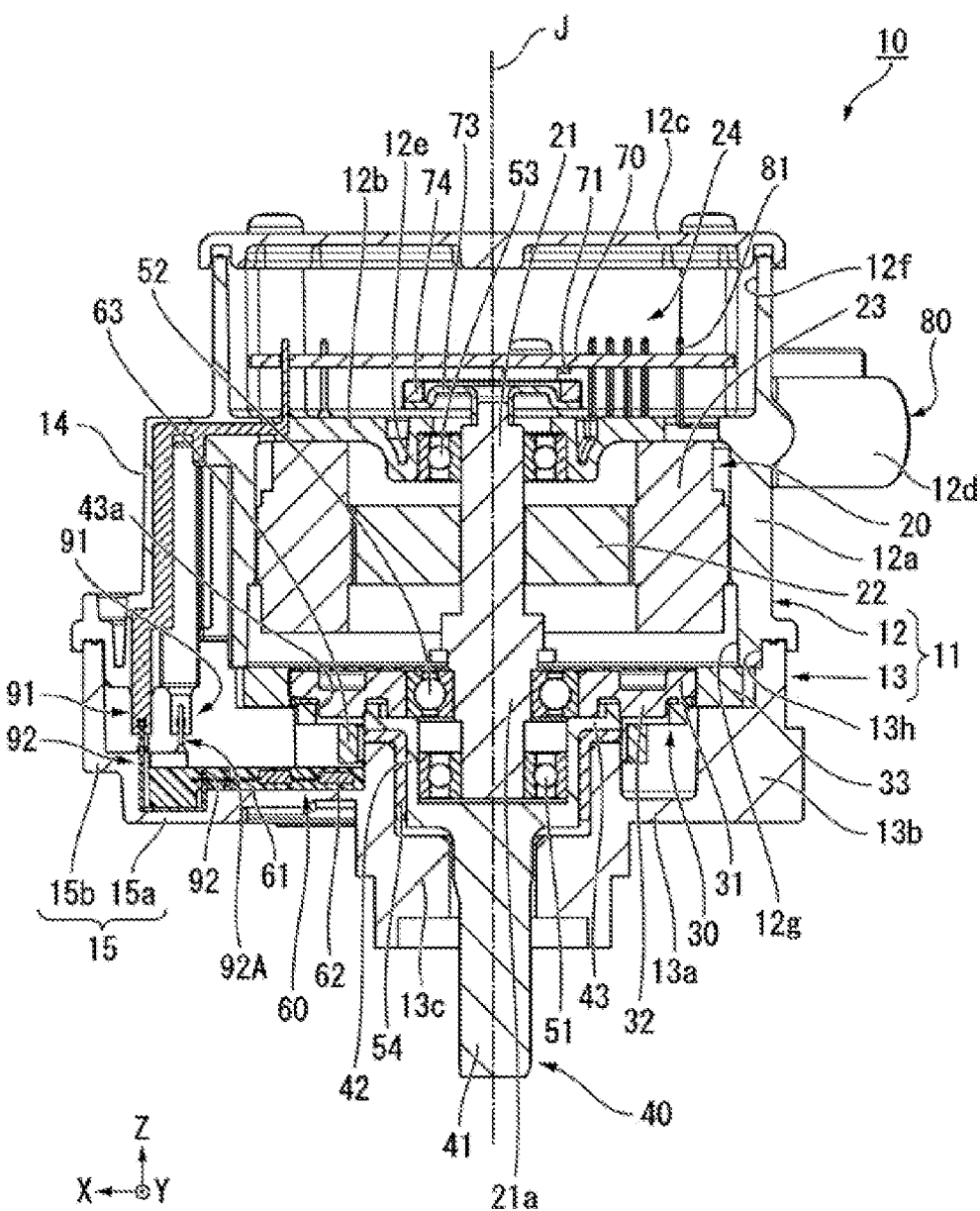
FIG. 1 is a cross-sectional view showing an electric actuator of the present embodiment.

In the drawings, a Z axis direction is a vertical direction in which the positive side is the upper side and the negative side is the lower side. An axial direction of a central axis J appropriately shown in the drawings is parallel to the Z axis direction, that is, the vertical direction. An X axis direction is a direction that is orthogonal to the Z axis direction, that is, the axial direction Z. A Y axis direction is a direction that is orthogonal to both the axial direction Z and the X axis direction. In the following description, a direction parallel to the axial direction of the central axis J will be simply referred to as an "axial direction Z," a direction parallel to the X axis direction will be referred to as a "longitudinal direction X," and a direction parallel to the Y axis direction will be referred to as a "short-length direction Y." In addition, a radial direction with respect to the central axis J will be simply referred to as a "radial direction," and a circumferential direction with respect to the central axis J will be simply referred to as a "circumferential direction."

In the present embodiment, the axial direction Z corresponds to a first direction. The short-length direction Y corresponds to a second direction and a third direction. In addition, the lower side corresponds to one side in the first direction, and the upper side corresponds to the other side in the first direction. Here, the upper side and the lower side are only names for describing relative positional relationships between respective parts, and actual disposition relationships and the like may be disposition relationships or the like other than disposition relationships indicated by such names.

As shown in FIG. 1, an electric actuator 10 of the present embodiment includes a case 11, a motor 20 having a motor shaft 21 that extends in an axial direction Z of a central axis J, a control unit 24, a connector part 80, a deceleration mechanism 30, an output part 40, a rotation detection device 60, a first wiring member 91, a second wiring member 92, a first bearing 51, a second bearing 52, a third bearing 53, and a bush 54. The first bearing 51, the second bearing 52, and the third bearing 53 are, for example, a ball bearing.

The motor 20 and the deceleration mechanism 30 are accommodated in the case 11. The case 11 includes a motor case 12 in which the motor 20 is accommodated and a deceleration mechanism case 13 in which the deceleration mechanism 30 is accommodated. The motor case 12 includes a case tube part 12a, an upper lid part 12c, an annular plate part 12b, a bearing holding part 12e, a control board accommodating part 12f, a terminal holding part 12d, and a first wiring holding part 14.

The case tube part 12a has a cylindrical shape that extends in the axial direction Z with respect to the central axis J. The case tube part 12a opens on both sides in the axial direction Z. The case tube part 12a has a first opening 12g that opens to the lower side. That is, the motor case 12 has the first opening 12g. The case tube part 12a surrounds the outside of the motor 20 in the radial direction. The annular plate part 12b has an annular plate shape that extends radially inward from an inner circumferential surface of the case tube part 12a. The annular plate part 12b covers the upper side of a stator 23 (to be described below) of the motor 20. The bearing holding part 12e is provided on the inner edge of the annular plate part 12b in the radial direction. The bearing holding part 12e holds the third bearing 53.

The control board accommodating part 12f is a part in which a control board 70 (to be described below) is accommodated. The control board accommodating part 12f is formed radially inward from an upper part of the case tube part 12a. A bottom surface of the control board accommodating part 12f is an upper surface of the annular plate part 12b. The control board accommodating part 12f opens to the upper side. The upper lid part 12c is a plate-like lid that blocks an upper end opening of the control board accommodating part 12f. The terminal holding part 12d protrudes radially outward from the case tube part 12a. The terminal holding part 12d has a cylindrical shape that opens radially outward. The terminal holding part 12d holds a terminal 81 (to be described below).

The first wiring holding part 14 protrudes radially outward from the case tube part 12a. In FIG. 1, the first wiring holding part 14 protrudes to the positive side in the longitudinal direction X from the case tube part 12a. The first wiring holding part 14 extends in the axial direction Z. An axial direction position of the upper end of the first wiring holding part 14 is substantially the same as an axial direction position of the annular plate part 12b. A circumferential direction position of the first wiring holding part 14 is different from, for example, a circumferential direction position of the connector part 80.

The deceleration mechanism case 13 includes a bottom wall 13a, a tube part 13b, a protruding tube part 13c, and a second wiring holding part 15. The bottom wall 13a has an annular plate shape centered on the central axis J. The bottom wall 13a covers the lower side of the deceleration mechanism 30. The tube part 13b has a cylindrical shape that protrudes from the outer edge of the bottom wall 13a in the radial direction to the upper side. The tube part 13b opens to the upper side. The upper end of the tube part 13b comes in contact with and is fixed to the lower end of the case tube part 12a. The protruding tube part 13c has a cylindrical shape that protrudes from the inner edge of the bottom wall 13a in the radial direction to both sides in the axial direction. The protruding tube part 13c opens to both sides in the axial direction. The upper end of the protruding tube part 13c is positioned lower than the upper end of the tube part 13b.

The bush 54 having a cylindrical shape that extends in the axial direction Z is disposed inside the protruding tube part 13c. The bush 54 is fitted to the protruding tube part 13c and is fixed into the protruding tube part 13c. The bush 54 has a flange part that protrudes radially outward at its upper end. The flange part of the bush 54 comes in contact with the upper end of the protruding tube part 13c from the upper side.

The second wiring holding part 15 protrudes radially outward from the tube part 13b. In FIG. 1, the second wiring holding part 15 protrudes from the tube part 13b to the positive side in the longitudinal direction X. The second wiring holding part 15 is disposed below the first wiring holding part 14. The second wiring holding part 15 has, for example, a hollow box shape that opens to the upper side. The inside of the second wiring holding part 15 is connected to the inside of the tube part 13b.

The second wiring holding part 15 includes a bottom wall 15a and a side wall 15b. The bottom wall 15a has a plate shape that extends radially outward from the bottom wall 13a. In FIG. 1, the bottom wall 15a extends from the bottom wall 13a to the positive side in the longitudinal direction X. The side wall 15b extends from the outer edge of the bottom wall 15a to the upper side. The deceleration mechanism case 13 has a second opening 13h. In the present embodiment, the second opening 13h is constituted by an opening on the upper side of the tube part 13b and an opening on the upper side of the second wiring holding part 15.

Figure 2:
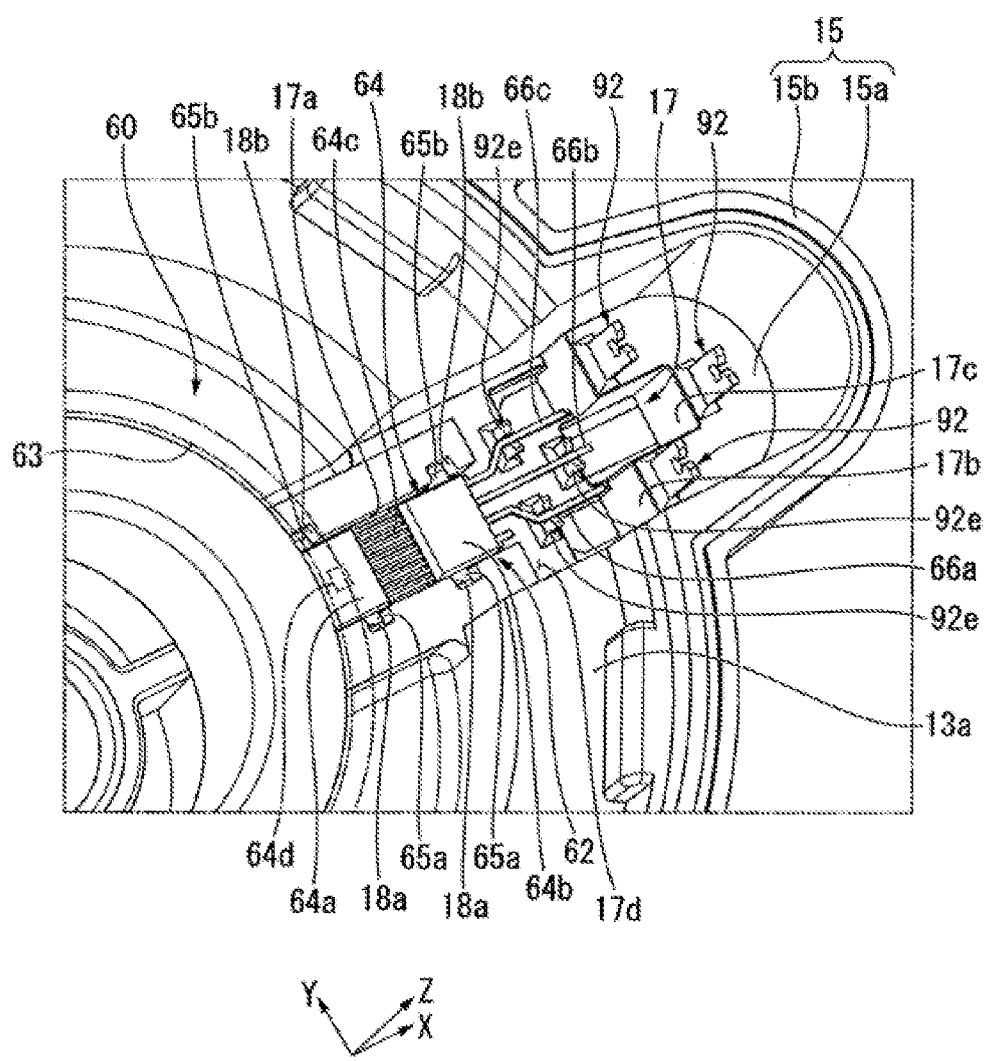
FIG. 2 is a perspective view showing a part of the electric actuator of the present embodiment.
Figure 3:
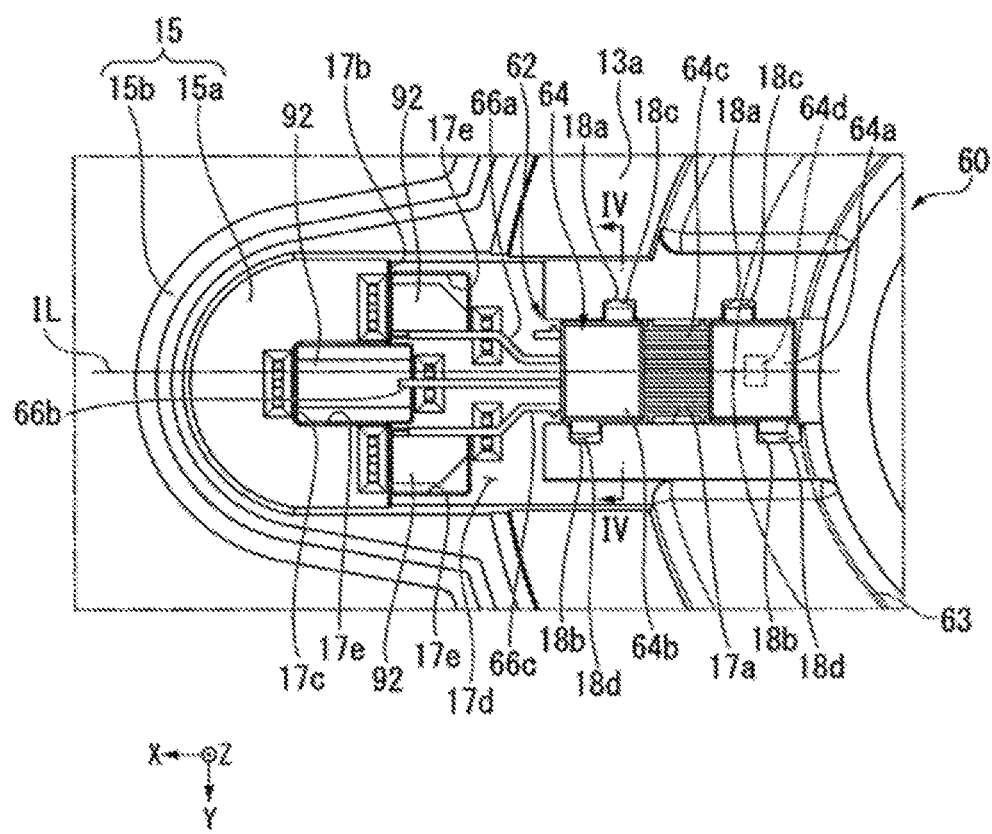
FIG. 3 is a diagram of a part of the electric actuator of the present embodiment when viewed from the upper side.

As shown in FIG. 2 and FIG. 3, the case 11 has a first recess 17 and second recesses 18a and 18b that are recessed downward from an inner surface of the case 11. The first recess 17 is provided across an upper surface of the bottom wall 13a and an upper surface of the bottom wall 15a. The first recess 17 extends in the radial direction. In the present embodiment, a direction in which the first recess 17 extends is a direction parallel to the longitudinal direction X among radial directions. A bottom surface 17d of the first recess 17 is orthogonal to the axial direction Z.

The first recess 17 includes a main body accommodating part 17a, a terminal accommodating part 17b, and an extending part 17c. The main body accommodating part 17a is one side end of the first recess 17 in the longitudinal direction. The main body accommodating part 17a is provided on the upper surface of the bottom wall 13a. A sensor main body 64 (to be described below) is accommodated in the main body accommodating part 17a. The inner edge of the main body accommodating part 17a has a rectangular shape when viewed from the upper side. Here, in the present embodiment, one side in the longitudinal direction is the negative side in the longitudinal direction X and is the inner side in the radial direction. The other side in the longitudinal direction is the positive side in the longitudinal direction X and the outer side in the radial direction.

The terminal accommodating part 17b is connected to the other side end of the main body accommodating part 17a in the longitudinal direction. The terminal accommodating part 17b is provided across an upper surface of the bottom wall 13a and an upper surface of the bottom wall 15a. The inner edge of the terminal accommodating part 17b has a rectangular shape when viewed from the upper side. A size of the terminal accommodating part 17b in the short-length direction Y is larger than a size of the main body accommodating part 17a in the short-length direction Y.

The extending part 17c is connected to the other side end of the terminal accommodating part 17b in the longitudinal direction. The extending part 17c extends from an inner surface of the other side of the terminal accommodating part 17b in the longitudinal direction to the other side in the longitudinal direction. The extending part 17c is the other side end of the first recess 17 in the longitudinal direction. The extending part 17c is provided on an upper surface of the bottom wall 15a. The inner edge of the extending part 17c has a rectangular shape when viewed from the upper side. A size of the extending part 17c in the short-length direction Y is larger than a size of the main body accommodating part 17a in the short-length direction Y and a size of the terminal accommodating part 17b in the short-length direction Y.

On the bottom surface 17d of the first recess 17, a through-hole 17e that penetrates the bottom wall 13a in the axial direction Z is provided. A total of three through-holes 17e are provided; two through-holes 17e at the bottom surface of the terminal accommodating part 17b within the bottom surface 17d, and one through-hole at the bottom surface of the extending part 17c within the bottom surface 17d. The through-hole 17e faces a part of the second wiring member 92 in the axial direction Z. Before a holding member 61 (to be described below) is provided, a part of the second wiring member 92 that faces the through-hole 17e is exposed into the case 11 through the through-hole 17e.

The insides of the second recesses 18a and 18b are connected to the inside of the first recess 17. More specifically, the insides of the second recesses 18a and 18b are connected to the inside of the main body accommodating part 17a. The second recess 18a opens to the inner surface on the one side of the main body accommodating part 17a in the short-length direction. The second recess 18b opens to the inner surface on the other side of the main body accommodating part 17a in the short-length direction. In the present embodiment, one side in the short-length direction is the negative side in the short-length direction Y and corresponds to one side in the second direction. The other side in the short-length direction is the positive side in the short-length direction Y and corresponds to the other side in the second direction.

The bottom surface of the second recess 18a is a support surface 18c. The bottom surface of the second recess 18b is a support surface 18d. That is, the case 11 has the support surfaces 18c and 18d. The support surfaces 18c and 18d face upward and are disposed above the bottom surface 17d of the first recess 17. In the present embodiment, the support surfaces 18c and 18d extend in the short-length direction Y from the inner surface of the main body accommodating part 17a in the short-length direction Y among the inner surfaces of the first recess 17.

Two second recesses 18a are provided apart from each other in the longitudinal direction X. Two second recesses 18b are provided apart from each other in the longitudinal direction X. An interval between the two second recesses 18a in the longitudinal direction X is smaller than an interval between the two second recesses 18b in the longitudinal direction X. In the longitudinal direction X, a position of the second recess 18a is different from a position of the second recess 18b. Thereby, in the longitudinal direction X, a position of the support surface 18c is different from a position of the support surface 18d.

More specifically, the second recess 18a on one side in the longitudinal direction between the two second recesses 18a and the support surface 18c thereof are disposed on the other side in the longitudinal direction relative to the second recess 18b on the one side in the longitudinal direction between the two second recesses 18b and the support surface 18d thereof. The second recess 18a on the other side in the longitudinal direction between the two second recesses 18a and the support surface 18c thereof are disposed on the one side in the longitudinal direction relative to the second recess 18b on the other side in the longitudinal direction between the two second recesses 18b and the support surface 18d thereof.

As shown in FIG. 1, the motor case 12 and the deceleration mechanism case 13 are fixed to each other while the first opening 12g and the second opening 13h face each other in the axial direction Z. In the present embodiment, a lower side end of the motor case 12 includes a lower side end of the case tube part 12a and a lower side end of the first wiring holding part 14. In the present embodiment, an upper side end of the deceleration mechanism case 13 includes an upper side end of the tube part 13b and an upper side end of the second wiring holding part 15. While the motor case 12 and the deceleration mechanism case 13 are fixed to each other, the inside of the first opening 12g and the inside of the second opening 13h are connected to each other.

The motor 20 includes the motor shaft 21, a rotor 22, and the stator 23. The motor shaft 21 is supported by the first bearing 51, the second bearing 52, and the third bearing 53 and is rotatable with respect to the central axis J. An upper end of the motor shaft 21 passes through the bearing holding part 12e in the axial direction Z, and protrudes to the upper side from the annular plate part 12b. Although not shown, an eccentric shaft part 21a which is a part of the motor shaft 21 supported by the second bearing 52 extends with respect to the eccentric shaft that is parallel to the central axis J and eccentric with respect to the central axis J.

The rotor 22 includes a cylindrical rotor core that is fixed to an outer circumferential surface of the motor shaft 21 and a magnet that is fixed to an outer circumferential surface of the rotor core. The stator 23 includes an annular stator core that surrounds the outside of the rotor 22 in the radial direction and a plurality of coils mounted on the stator core. The stator 23 is fixed to an inner circumferential surface of the case tube part 12a. Thereby, the motor 20 is held by the motor case 12.

The control unit 24 includes the control board 70, a second attachment member 73, a second magnet 74, and a second rotation sensor 71. That is, the electric actuator 10 includes the control board 70, the second attachment member 73, the second magnet 74, and the second rotation sensor 71.

The control board 70 has a plate shape that extends in a plane orthogonal to the axial direction Z. The control board 70 is accommodated in the motor case 12. More specifically, the control board 70 is accommodated in the control board accommodating part 12f and is disposed upward and away from the annular plate part 12b. The control board 70 is a board that is electrically connected to the motor 20. A coil of the stator 23 is electrically connected to the control board 70. The control board 70 controls, for example, a current supplied to the motor 20. That is, for example, an inverter circuit is mounted on the control board 70.

The second attachment member 73 has an annular shape centered on the central axis J. An inner circumferential surface of the second attachment member 73 is fixed to an outer circumferential surface of an upper end of the motor shaft 21. The second attachment member 73 is disposed above the third bearing 53 and the bearing holding part 12e. The second attachment member 73 is made of, for example, a nonmagnetic material. Here, the second attachment member 73 may be made of a magnetic material.

The second magnet 74 has an annular shape centered on the central axis J. The second magnet 74 is fixed to an upper end surface of the outer edge of the second attachment member 73 in the radial direction. A method of fixing the second magnet 74 to the second attachment member 73 is not particularly limited. For example, an adhesive is used for bonding. The second attachment member 73 and the second magnet 74 rotate together with the motor shaft 21. The second magnet 74 is disposed above the third bearing 53 and the bearing holding part 12e. The second magnet 74 has an N pole and an S pole that are alternately disposed in the circumferential direction. An upper surface of the second magnet 74 is covered with a magnet cover.

The second rotation sensor 71 is a sensor configured to detect rotation of the motor 20. The second rotation sensor 71 is attached to a lower surface of the control board 70. The second rotation sensor 71 faces the second magnet 74 and a magnet cover covering the upper surface of the second magnet 74 via a gap in the axial direction Z. The second rotation sensor 71 detects a magnetic field generated by the second magnet 74. The second rotation sensor 71 is, for example, a Hall element. Although not shown, a plurality of, for example, three second rotation sensors 71 are provided in the circumferential direction. When change in the magnetic field generated by the second magnet 74 that rotates together with the motor shaft 21 is detected using the second rotation sensor 71, rotation of the motor shaft 21 can be detected.

The connector part 80 is a part for connection to an electrical wiring outside the case 11. The connector part 80 is provided in the motor case 12. The connector part 80 includes the terminal holding part 12*d* and the terminal 81 described above. The terminal 81 is embedded and held in the terminal holding part 12*d*. One end of the terminal 81 is fixed to the control board 70. The other end of the terminal 81 is exposed to the outside of the case 11 through the inside of the terminal holding part 12*d*. In the present embodiment, the terminal 81 is, for example, a bus bar.

An external power supply is connected to the connector part 80 through an electrical wiring (not shown). More specifically, an external power supply is attached to the terminal holding part 12*d*, and an electrical wiring of the external power supply is electrically connected to a part of the terminal 81 that protrudes into the terminal holding part 12*d*. Thereby, the terminal 81 electrically connects the control board 70 and electrical wiring. Thus, in the present embodiment, power is supplied to a coil of the stator 23 from the external power supply through the terminal 81 and the control board 70.

The deceleration mechanism 30 is disposed outside a lower side part of the motor shaft 21 in the radial direction. The deceleration mechanism 30 is accommodated inside the deceleration mechanism case 13. The deceleration mechanism 30 is disposed between the bottom wall 13*a* and the motor 20 in the axial direction Z. The deceleration mechanism 30 includes an external gear 31, an internal gear 33, and an annular part 43.

The external gear 31 has a substantially annular plate shape that extends in a plane orthogonal to the axial direction Z with respect to the eccentric shaft of the eccentric shaft part 21*a*. A gear part is provided on the outer surface of the external gear 31 in the radial direction. The external gear 31 is connected to the motor shaft 21 through the second bearing 52. Thereby, the deceleration mechanism 30 is connected to the motor shaft 21. The external gear 31 is fitted to an outer ring of the second bearing 52 from the outside in the radial direction. Thereby, the second bearing 52 connects the motor shaft 21 and the external gear 31 around the eccentric shaft in a relatively rotatable manner.

The external gear 31 has a plurality of pins 32. The pins 32 have a cylindrical shape that protrudes to the lower side. Although not shown, the plurality of pins 32 are disposed at equal intervals over one circumference in a circumferential direction with respect to the eccentric shaft.

The internal gear 33 is fixed while surrounding the outside of the external gear 31 in the radial direction and, and meshes with the external gear 31. The internal gear 33 has an annular shape centered on the central axis J. The outer edge of the internal gear 33 in the radial direction is disposed on and fixed to a step part that is recessed outward in the radial direction, which is provided on an inner circumferential surface of the tube part 13*b*. Thereby, the deceleration mechanism 30 is held in the deceleration mechanism case 13. A gear part is provided on the inner circumferential surface of the internal gear 33. The gear part of the internal gear 33 meshes with the gear part of the external gear 31. More specifically, the gear part of the internal gear 33 meshes partially with the gear part of the external gear 31.

The annular part 43 is a part of the output part 40. The annular part 43 is disposed below the external gear 31. The annular part 43 has an annular plate shape that extends in the radial direction with respect to the central axis J. The annular part 43 comes in contact with a flange part of the bush 54 from the upper side. The annular part 43 has a plurality of holes 43*a* that penetrate the annular part 43 in the axial direction Z. Although not shown, the shape thereof when viewed from the hole 43*a* in the axial direction Z is a circular shape. The inner diameter of the hole 43*a* is larger than the outer diameter of the pin 32. The plurality of pins 32 provided in the external gear 31 pass through the plurality of holes 43*a*. An outer circumferential surface of the pin 32 is inscribed in an inner circumferential surface of the hole 43*a*. The inner circumferential surface of the hole 43*a* supports the external gear 31 through the pin 32 in such a manner that it is swingable around the central axis J.

The output part 40 is a part that outputs a driving force of the electric actuator 10. The output part 40 includes the annular part 43, a cylindrical part 42, and an output shaft part 41. The cylindrical part 42 has a cylindrical shape that extends from the inner edge of the annular part 43 to the lower side. The cylindrical part 42 has a cylindrical shape that includes a bottom part and opens to the upper side. The cylindrical part 42 is fitted to the inside of the bush 54 in the radial direction. The first bearing 51 is fixed to an inner circumferential surface of the cylindrical part 42. Thereby, the first bearing 51 connects the motor shaft 21 and the output part 40 in a relatively rotatable manner. A lower end of the motor shaft 21 is positioned inside the cylindrical part 42. A lower end surface of the motor shaft 21 faces an upper surface of a bottom part of the cylindrical part 42 via a gap.

The output shaft part 41 extends in the axial direction Z and is disposed below the motor shaft 21. In the present embodiment, the output shaft part 41 has a cylindrical shape centered on the central axis J. The output shaft part 41 extends from a bottom part of the cylindrical part 42 to the lower side. The output shaft part 41 passes through the inside of the protruding tube part 13*c*. A lower end of the output shaft part 41 protrudes downward from the protruding tube part 13*c*. Another member to which a driving force of the electric actuator 10 is output is attached to a lower end of the output shaft part 41. In the present embodiment, the output part 40 is a single member.

When the motor shaft 21 is rotated around the central axis J, the eccentric shaft part 21*a* revolves in the circumferential direction with respect to the central axis J. Revolving of the eccentric shaft part 21*a* is transmitted to the external gear 31 through the second bearing 52, and the external gear 31 swings while a position inscribing an inner circumferential surface of the hole 43*a* and an outer circumferential surface of the pin 32 changes. Thereby, a position at which the gear part of the external gear 31 meshes with the gear part of the internal gear 33 changes in the circumferential direction. Thus, a rotational force of the motor shaft 21 is transmitted to the internal gear 33 through the external gear 31.

Here, in the present embodiment, since the internal gear 33 is fixed, it does not rotate. Therefore, due to a reaction force for a rotational force transmitted to the internal gear 33, the external gear 31 rotates around the eccentric shaft. In this case, a direction in which the external gear 31 rotates is opposite to a direction in which the motor shaft 21 rotates. Rotation around the eccentric shaft of the external gear 31 is transmitted to the annular part 43 through the hole 43a and the pin 32. Thereby, the output part 40 rotates around the central axis J. In this manner, rotation of the motor shaft 21 is transmitted to the output part 40 through the deceleration mechanism 30.

Rotation of the output part 40 is decelerated with respect to rotation of the motor shaft 21 by the deceleration mechanism 30. Specifically, in the configuration of the deceleration mechanism 30 of the present embodiment, a reduction ratio R of rotation of the output part 40 with respect to rotation of the motor shaft 21 is represented by $R=-(N2-N1)/N2$. The negative sign at the beginning of the formula representing the reduction ratio R indicates that a direction in which the output part 40 to be decelerated rotates is opposite to a direction in which the motor shaft 21 rotates. N1 indicates the number of teeth of the external gear 31 and N2 indicates the number of teeth of the internal gear 33. As an example, when the number of teeth N1 of the external gear 31 is 59 and the number of teeth N2 of the internal gear 33 is 60, the reduction ratio R becomes $-1/60$.

In this manner, according to the deceleration mechanism 30 of the present embodiment, the reduction ratio R of rotation of the output part 40 with respect to rotation of the motor shaft 21 can become relatively large. Therefore, a rotation torque of the output part 40 can become relatively large.

The rotation detection device 60 detects rotation of the output part 40. At least a part of the rotation detection device 60 is disposed at a position at which it overlaps the cylindrical part 42 in the radial direction. The rotation detection device 60 is accommodated in the deceleration mechanism case 13. The rotation detection device 60 includes a first magnet 63, a first rotation sensor 62, and the holding member 61. That is, the electric actuator 10 includes the first magnet 63, the first rotation sensor 62, and the holding member 61.

The first magnet 63 has a cylindrical shape centered on the central axis J. The first magnet 63 is fixed to a lower surface of the annular part 43. The first magnet 63 is disposed at the upper end of the protruding tube part 13c and radially outward from the cylindrical part 42 and the bush 54, and surrounds the upper end of the protruding tube part 13c, and the cylindrical part 42 and the bush 54.

The first rotation sensor 62 detects rotation of the output part 40. The first rotation sensor 62 is, for example, a Hall element. As shown in FIG. 2, the first rotation sensor 62 includes the sensor main body 64, a first projection 65a and a second projection 65b as projections, and a plurality of sensor terminals 66a, 66b, and 66c. The sensor main body 64 has a substantially rectangular parallelepiped shape that extends in the longitudinal direction X and is flat in the axial direction Z. The sensor main body 64 is accommodated in the first recess 17. More specifically, the sensor main body 64 is accommodated in the main body accommodating part 17a. The sensor main body 64 includes a first part 64a, a second part 64b, and a connecting part 64c. The first part 64a has a substantially square shape when viewed from the upper side. The first part 64a includes a sensor chip 64d therein. That is, the sensor main body 64 has the sensor chip 64d.

The sensor chip 64d is disposed below the first magnet 63. The sensor chip 64d detects a magnetic field generated by the first magnet 63. When change in the magnetic field generated by the first magnet 63 that rotates together with the output part 40 is detected using the sensor chip 64d, the first rotation sensor 62 can detect rotation of the output part 40.

The second part 64b is disposed on the other side of the first part 64a in the longitudinal direction, that is, radially outward. The second part 64b has a substantially square shape when viewed from the upper side. In the second part 64b, the sensor terminals 66a, 66b, and 66c are held. The connecting part 64c connects the first part 64a and the second part 64b. The connecting part 64c electrically connects the sensor chip 64d and the sensor terminals 66a, 66b, and 66c.

The first projection 65a and the second projection 65b protrude in the short-length direction Y orthogonal to the axial direction Z from the sensor main body 64. The first projection 65a protrudes from the sensor main body 64 to one side in the short-length direction. The second projection 65b protrudes from the sensor main body 64 to the other side in the short-length direction. The first projection 65a and the second projection 65b have a plate shape with a plate surface that is orthogonal to the axial direction Z.

Figure 4:
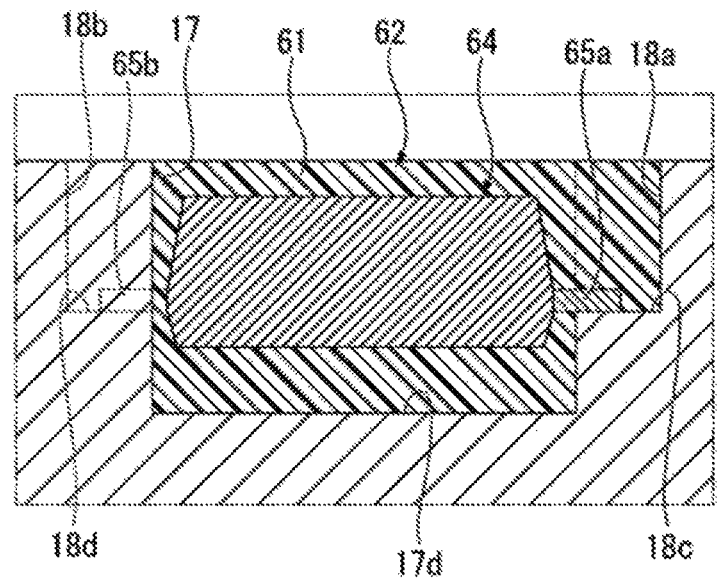
FIG. 4 is a diagram showing a part of the electric actuator of the present embodiment and is a cross-sectional view taken along the line IV-IV in FIG. 3.

As shown in FIG. 4, the first projection 65a is supported on the support surface 18c from below. The second projection 65b is supported on the support surface 18d from below. Since the support surfaces 18c and 18d are disposed above the bottom surface 17d of the first recess 17, when the projections are supported on the support surfaces 18c and 18d, the sensor main body 64 is disposed upward and away from the bottom surface 17d of the first recess 17. Thereby, the sensor main body 64 can be held away from the case 11. Thus, when a coefficient of thermal expansion of the sensor main body 64 is different from a coefficient of thermal expansion of the case 11, even if the sensor main body 64 and the case 11 are thermally deformed, stress is unlikely to be applied to the sensor main body 64. Therefore, distortion or damage on the sensor chip 64d of the sensor main body 64 can be reduced. As described above, according to the present embodiment, the electric actuator 10 having a structure through which decrease in detection accuracy of the first rotation sensor 62 can be reduced is obtained.

In addition, since the first rotation sensor 62 can be held in the first recess 17 that is recessed downward from the inner surface of the case 11, compared to a case in which a case for accommodating another member that holds the first rotation sensor 62 is separately provided, it is possible to reduce the number of components of the electric actuator 10.

In addition, according to the present embodiment, since the first projection 65a and the second projection 65b are provided as projections, the sensor main body 64 can be supported on both sides in the short-length direction Y. Thereby, the sensor main body 64 can be held in the case 11 more stably. As shown in FIG. 2, the first projection 65a is fitted to the second recess 18a. The second projection 65b is fitted to the second recess 18b. Thereby, by the second recesses 18a and 18b, the first projection 65a and the second projection 65b can be positioned in the longitudinal direction X, and the first rotation sensor 62 can be positioned in the longitudinal direction X.

A plurality of first projections 65a and a plurality of second projections 65b are provided. Two first projections 65a are provided apart from each other in the longitudinal direction X. The two first projections 65a protrude from the first part 64a and the second part 64b. Two second projections 65b are provided apart from each other in the longitudinal direction X. The two second projections 65b protrude from the first part 64a and the second part 64b. In the longitudinal direction X orthogonal to both the axial direction Z and the short-length direction Y, a position of the first projection 65a is different from a position of the second projection 65b. Therefore, when the first rotation sensor 62 is reversed in the short-length direction Y, positions of the projections and the second recesses in the longitudinal direction X are shifted, and it becomes difficult for the projections to be appropriately fitted to the second recesses. Thereby, it is possible to minimize disposition of the first rotation sensor 62 in the first recess 17 in an inappropriate direction.

The first projection 65a on one side in the longitudinal direction between the two first projections 65a is disposed on the other side in the longitudinal direction relative to the second projection 65b on the one side in the longitudinal direction between the two second projections 65b. The first projection 65a on the other side in the longitudinal direction between the two first projections 65a is disposed on the one side in the longitudinal direction relative to the second projection 65b on the other side in the longitudinal direction between the two second projections 65b. A disposition interval between the first projections 65a in the longitudinal direction X is different from a disposition interval between the second projections 65b in the longitudinal direction X. Therefore, when the first rotation sensor 62 is reversed in the short-length direction Y, it is not possible to fit the projections to the second recesses. Thereby, it is possible to further minimize disposition of the first rotation sensor 62 in the first recess 17 in an inappropriate direction. An interval between the first projections 65a in the longitudinal direction X is smaller than an interval between the second projections 65b in the longitudinal direction X.

The sensor terminals 66a, 66b, and 66c extend from the sensor main body 64 to the other side in the longitudinal direction, that is, radially outward. The sensor terminals 66a, 66b, and 66c are accommodated in the terminal accommodating part 17b. The sensor terminals 66a, 66b, and 66c are electrically connected to the sensor chip 64d through the connecting part 64c. The plurality of sensor terminals 66a, 66b, and 66c are disposed side by side in the short-length direction Y. The sensor terminal 66b is disposed between the sensor terminal 66a and the sensor terminal 66c in the short-length direction Y. The sensor terminal 66b extends linearly in the longitudinal direction X. The sensor terminals 66a and 66c each include a first bent part that is bent to the side away from the sensor terminal 66b in the short-length direction Y from the sensor main body 64 toward the other side in the longitudinal direction and a second bent part that is bent toward the sensor terminal 66b on the other side in the longitudinal direction relative to the first bent part.

The sensor terminals 66a, 66b, and 66c are connected to one end 92e (to be described below) of the second wiring member 92. As shown in FIG. 3, the sensor terminals 66a, 66b, and 66c are asymmetrically disposed with respect to an imaginary line IL that passes through the center of the sensor main body 64 in the short-length direction Y. Therefore, for example, when the first rotation sensor 62 is reversed in the short-length direction Y and disposed, positions of the sensor terminals 66a, 66b, and 66c in the short-length direction Y change, and connection to each of the one ends 92e is not possible. Thereby, it is possible to further minimize disposition of the first rotation sensor 62 in the first recess 17 in an inappropriate direction.

In the present embodiment, the sensor terminal 66a is disposed on one side in the short-length direction relative to the imaginary line IL. The sensor terminals 66b and 66c are disposed on the other side in the short-length direction relative to the imaginary line IL. The sensor terminal 66a and the sensor terminal 66c are symmetrically disposed in the short-length direction Y with respect to the sensor terminal 66b. Among the three sensor terminals 66a, 66b, and 66c, one sensor terminal is a sensor terminal for signal transmission, one of the other sensor terminals is a sensor terminal for grounding, and the remaining one sensor terminal is a sensor terminal for power supply.

Figure 5:
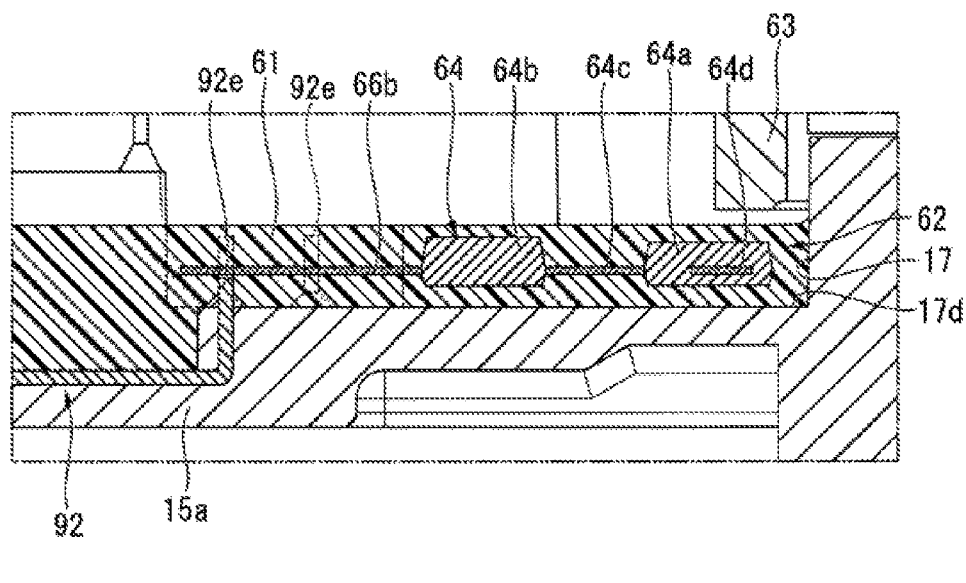
FIG. 5 is a cross-sectional view showing a part of the electric actuator of the present embodiment.

As shown in FIG. 5, the holding member 61 is a member that holds the first rotation sensor 62 in the case 11. The holding member 61 is accommodated in the first recess 17. The holding member 61 holds the sensor main body 64 on an inner surface of the first recess 17. The holding member 61 is an elastic component in close contact with the sensor main body 64. Therefore, a difference between an amount of thermal deformation of the first rotation sensor 62 and an amount of thermal deformation of the case 11 according to a difference in coefficients of thermal expansion can be canceled out when the holding member 61 elastically deforms. Thereby, it is possible to further minimize stress applied to the sensor main body 64. Therefore, it is possible to further reduce decrease in detection accuracy of the first rotation sensor 62.

The expression "the holding member holds the first rotation sensor in the case" in this specification includes the meaning that the holding member supports at least a part of a surface of a first rotation sensor. For example, the holding member may be a member that supports a lower surface and a side surface of the first rotation sensor. In addition, the expression "the holding member holds the sensor main body on an inner surface of the first recess" in this specification includes the meaning that the holding member is in contact with both at least a part of a surface of the sensor main body and at least a part of an inner surface of the first recess.

In the present embodiment, the holding member 61 is formed by pouring a resin adhesive into the first recess 17 and curing it. That is, the holding member 61 is an elastic component made of an adhesive. Therefore, the first rotation sensor 62 can be held in the first recess 17 more appropriately by the holding member 61. The holding member 61 is made of a resin. The sensor main body 64 is embedded in the holding member 61. Therefore, the sensor main body 64 can be protected by the holding member 61, and it is possible to reduce adhesion of an oil and the like to the sensor main body 64. The holding member 61 covers the entire first rotation sensor 62. Here, in FIG. 2 and FIG. 3, the holding member 61 is not shown.

The first wiring member 91 and the second wiring member 92 shown in FIG. 1 are electrically connected to the rotation detection device 60. In the present embodiment, the first wiring member 91 and the second wiring member 92 are wiring members for connecting the first rotation sensor 62 of the rotation detection device 60 and the control board 70 of the control unit 24. Although not shown, in the present embodiment, three first wiring members 91 and three second wiring members 92 are provided.

In the present embodiment, the first wiring member 91 and the second wiring member 92 are elongated plate-like bus bars. The first wiring member 91 is embedded in the first wiring holding part 14. One end of the first wiring member 91 protrudes downward from the first wiring holding part 14, and is exposed into the second wiring holding part 15. The other end of the first wiring member 91 is exposed into the control board accommodating part 12f and is connected to the control board 70.

As shown in FIG. 1 and FIG. 5, a part of the second wiring member 92 is embedded and held in the bottom wall 15a. As shown in FIG. 2, the one end 92e of the second wiring member 92 protrudes upward from the bottom surface 17d of the first recess 17 and is exposed into the first recess 17. More specifically, the one end 92e protrudes upward from a bottom surface of the terminal accommodating part 17b. An upper end of the one end 92e is disposed below an upper surface of the bottom wall 13a. As shown in FIG. 5, the one end 92e is embedded in the holding member 61. As shown in FIG. 2, upper ends of the one ends 92e are branched into two parts, and the sensor terminals 66a, 66b, and 66c are fitted into gaps of the upper ends of the one ends 92e branched into two parts. Thereby, the sensor terminals 66a, 66b, and 66c are connected to the one ends 92e in the three second wiring members 92, and the first rotation sensor 62 and the second wiring member 92 are electrically connected to each other.

The three one ends 92e are disposed in the circumferential direction. The one end 92e disposed at the center in the circumferential direction among the three one ends 92e is disposed on the other side in the longitudinal direction relative to the one ends 92e disposed on both sides in the circumferential direction among the three one ends 92e, that is, radially outward. The other ends of the second wiring members 92 protrude upward from an upper surface of the bottom wall 15a. The other ends of the second wiring members 92 are disposed in the circumferential direction. The other end disposed at the center in the circumferential direction among the three other ends in the second wiring members 92 is disposed on the other side in the longitudinal direction relative to the other ends disposed on both sides in the circumferential direction among the three other ends, that is, radially outward.

As shown in FIG. 1, the other end of the second wiring member 92 is connected to one end that protrudes downward from the first wiring holding part 14 within the first wiring member 91. Thereby, the first wiring member 91 and the second wiring member 92 are electrically connected to each other, and the first rotation sensor 62 and the control board 70 are electrically connected through the first wiring member 91 and the second wiring member 92.

The disclosure is not limited to the above embodiment, and other configurations can be used. The first direction in which the first recess is recessed may be a direction different from the axial direction Z. While the support surface is a bottom surface of the second recess in the above embodiment, the disclosure is not limited thereto. The support surface may be an edge of the first recess within the upper surface of the bottom wall. The support surface may be provided on a convex part that protrudes upward from a bottom surface of the first recess. In this case, the convex part may be connected to an inner surface of the first recess, and disposed away from the inner surface of the first recess. A plurality of projections may be supported on one support surface.

The first rotation sensor is not particularly limited as long as it can detect rotation of the output part. The first rotation sensor may be a magnetoresistive element. At least one projection may be provided and the number of projections is not limited. The third direction in which sensor terminals are arranged may be a direction different from the second direction in which projections protrude. The plurality of sensor terminals may be symmetrically disposed with respect to the imaginary line IL. The second rotation sensor may be a magnetoresistive element.

The holding member is not particularly limited as long as it can hold the first rotation sensor in the accommodating part. The holding member may cover only a part of the sensor main body. The holding member may be made a substance other than the adhesive. The configuration of the deceleration mechanism is not particularly limited as long as it can decelerate rotation of the motor shaft.

Applications of the electric actuator of the disclosure are not limited and the electric actuator of the disclosure may be mounted in any device. In addition, the above configurations can be appropriately combined within ranges not contradictory to each other.

Features of the above-described embodiments and the modifications thereof may be combined appropriately as long as no conflict arises.

While embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric actuator comprising:
a motor having a motor shaft that extends in an axial direction;
a deceleration mechanism that is connected to the motor shaft;
a case in which the motor and the deceleration mechanism are accommodated;
an output part to which rotation of the motor shaft is transmitted through the deceleration mechanism;
a first rotation sensor that detects rotation of the output part; and
a holding member that holds the first rotation sensor in the case,
wherein the case comprises
a first recess that is recessed from an inner surface of the case to one side in a first direction, and
a support surface that faces the other side in the first direction and is disposed on the other side in the first direction relative to a bottom surface of the first recess,
wherein the first rotation sensor comprises
a sensor main body which comprises a sensor chip and is accommodated in the first recess, and
a projection that protrudes in a second direction orthogonal to the first direction from the sensor main body,
wherein the projection is supported on the support surface from one side in the first direction, and
wherein the sensor main body is disposed on the other side in the first direction away from the bottom surface of the first recess.

2. The electric actuator according to claim 1,
wherein the holding member is an elastic component which is accommodated in the first recess and in close contact with the sensor main body, and holds the sensor main body on an inner surface of the first recess.

3. The electric actuator according to claim 2,
wherein the elastic component is made of an adhesive.

4. The electric actuator according to claim 3,
wherein the sensor main body is embedded in the holding member.

5. The electric actuator according to claim 4,
wherein the projection of the first rotation sensor comprises at least one first projection part that protrudes from the sensor main body to one side in the second direction and at least one second projection part that protrudes from the sensor main body to the other side in the second direction as projections.

6. The electric actuator according to claim 5,
wherein, in a direction orthogonal to both the first direction and the second direction, a position of the first projection part is different from a position of the second projection part.

7. The electric actuator according to claim 6,
wherein the at least one first projection part is a plurality of first projection parts and the at least one second projection part is a plurality of second projection parts, and
wherein a disposition interval between the first projection parts is different from a disposition interval between the second projection parts.

8. The electric actuator according to claim 3,
wherein the projection of the first rotation sensor comprises at least one first projection part that protrudes from the sensor main body to one side in the second direction and at least one second projection part that protrudes from the sensor main body to the other side in the second direction as projections.

9. The electric actuator according to claim 3,
wherein the case comprises a second recess that is recessed to one side in the first direction,
wherein the support surface is a bottom surface of the second recess, and
wherein the projection is fitted to the second recess.

10. The electric actuator according to claim 3,
wherein the sensor main body comprises a plurality of sensor terminals that are electrically connected to the sensor chip, and
the plurality of sensor terminals are disposed side by side in a third direction, and are asymmetrically disposed with respect to an imaginary line that passes through a center of the sensor main body in the third direction.

11. The electric actuator according to claim 2,
wherein the sensor main body is embedded in the holding member.

12. The electric actuator according to claim 11
wherein the projection of the first rotation sensor comprises at least one first projection part that protrudes from the sensor main body to one side in the second direction and at least one second projection part that protrudes from the sensor main body to the other side in the second direction as projections.

13. The electric actuator according to claim 11,
wherein the case comprises a second recess that is recessed to one side in the first direction,
wherein the support surface is a bottom surface of the second recess, and
wherein the projection is fitted to the second recess.

14. The electric actuator according claim 11,
wherein the sensor main body comprises a plurality of sensor terminals that are electrically connected to the sensor chip, and
the plurality of sensor terminals are disposed side by side in a third direction, and are asymmetrically disposed with respect to an imaginary line that passes through a center of the sensor main body in the third direction.

15. The electric actuator according to claim 2,
wherein the projection of the first rotation sensor comprises at least one first projection part that protrudes from the sensor main body to one side in the second direction and at least one second projection part that protrudes from the sensor main body to the other side in the second direction as projections.

16. The electric actuator according to claim 2,
wherein the case comprises a second recess that is recessed to one side in the first direction,
wherein the support surface is a bottom surface of the second recess, and
wherein the projection is fitted to the second recess.

17. The electric actuator according to claim 2,
wherein the sensor main body comprises a plurality of sensor terminals that are electrically connected to the sensor chip, and
the plurality of sensor terminals are disposed side by side in a third direction, and are asymmetrically disposed with respect to an imaginary line that passes through a center of the sensor main body in the third direction.

18. The electric actuator according to claim 1,
wherein the projection of the first rotation sensor comprises at least one first projection part that protrudes from the sensor main body to one side in the second direction and at least one second projection part that protrudes from the sensor main body to the other side in the second direction.

19. The electric actuator according to claim 1,
wherein the case comprises a second recess that is recessed to one side in the first direction,
wherein the support surface is a bottom surface of the second recess, and
wherein the projection is fitted to the second recess.

20. The electric actuator according to claim 1,
wherein the sensor main body comprises a plurality of sensor terminals that are electrically connected to the sensor chip, and
the plurality of sensor terminals are disposed side by side in a third direction, and are asymmetrically disposed with respect to an imaginary line that passes through a center of the sensor main body in the third direction.

* * * * *